United States Patent [19]

Harradine

[11] Patent Number: 5,161,005

[45] Date of Patent: Nov. 3, 1992

[54] HUE CONTROL FOR COLOR VIDEO SYSTEMS

[75] Inventor: Vincent C. Harradine, Basingstoke, England

[73] Assignee: Sony Corporation, Tokyo, Japan

[21] Appl. No.: 482,048

[22] Filed: Feb. 20, 1990

[30] Foreign Application Priority Data

Apr. 20, 1989 [GB] United Kingdom ............... 8908942

[51] Int. Cl.$^5$ ............................................. H04N 9/64
[52] U.S. Cl. ..................................... 358/28; 358/23; 358/27
[58] Field of Search ............................ 358/28, 23, 27

[56] References Cited

U.S. PATENT DOCUMENTS

| | | | |
|---|---|---|---|
| 4,550,339 | 10/1985 | Fling ........................... | 358/28 |
| 4,554,576 | 11/1985 | Kao ............................ | 358/28 |
| 4,558,351 | 12/1985 | Fling et al. .................. | 358/28 |
| 4,809,059 | 2/1989 | Flamm et al. ................. | 358/28 |

FOREIGN PATENT DOCUMENTS

| | | | |
|---|---|---|---|
| 0039793 | 2/1986 | Japan ........................ | 358/28 |
| 0155795 | 6/1989 | Japan ........................ | 358/28 |
| 0221091 | 9/1989 | Japan ........................ | 358/28 |
| 0393812 | 10/1990 | Japan ........................ | 358/28 |
| 0290394 | 11/1990 | Japan ........................ | 358/28 |

*Primary Examiner*—James J. Groody
*Assistant Examiner*—Minsun Oh
*Attorney, Agent, or Firm*—Alvin Sinderbrand; William S. Frommer

[57] ABSTRACT

A hue control circuit receives a video signal at an input terminal in the form of alternating multiplexed color difference samples Cb and Cr. The video signal is multiplied in a multiplier by a factor cos $\phi$, $\phi$ representing a desired hue adjustment, and the resulting multiplied signal is supplied to an adder. The video signal is also subjected to order inversion by flip-flops and a buffer circuit as a result of which the order of corresponding pairs of samples Cb and Cr is reversed. The reversed-order video signal is multiplied in a second multiplier by one of alternating factors $-\sin \phi$ and $+\sin \phi$, and the resulting multiplied signal is supplied to the adder. The multiplied signals are summed in the adder to produce hue adjusted color difference samples Hb and Hr, where:

$$Hb = Cb \cos \phi - Cr \sin \phi$$

and $$Hr = Cb \sin \phi + Cr \cos \phi.$$

7 Claims, 2 Drawing Sheets

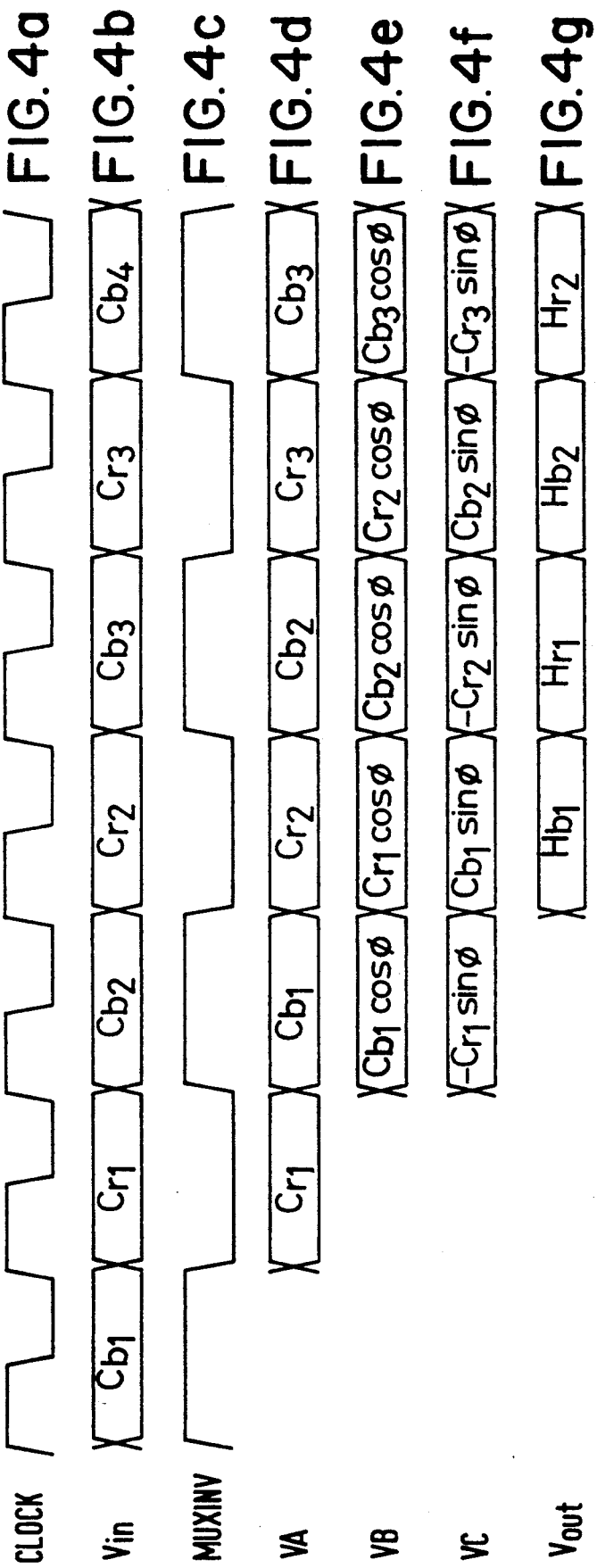

HUE CONTROL FOR COLOR VIDEO SYSTEMS

BACKGROUND OF THE INVENTION

1. Field of the Invention

This invention relates to hue control for color video systems, and in particular but not exclusively to hue control for component digital video systems.

2. Description of the Prior Art

In composite video systems such as NTSC analog video systems, hue control or adjustment is effected relatively simply by variation of the phase of the encoding or decoding subcarrier relative to the reference subcarrier burst. Thus any changes in the color of the resulting video image arising from phase variations can be compensated by control of the phase of the encoding or decoding subcarrier. The hue or color content of the signal can accordingly be varied while the saturation will remain constant.

However, in other types of video systems, it is not possible to provide a hue control of this type. For example, in a component video system using separate color component signals, there is no subcarrier and thus it is not possible to adjust the encoding or decoding subcarrier phase. Also, in a composite digital video system, hue control cannot be carried out in as simple a manner as that described above in the context of composite analog video systems.

SUMMARY OF THE INVENTION

It is an object of the present invention to provide a hue control circuit for varying the hue of a video signal, which circuit can be used either in component video systems or in composite digital video systems.

It is another object of the present invention to provide a hue control circuit for a composite digital video system of a simple circuit construction.

According to an aspect of the present invention there is provided a hue control circuit for varying the hue of a video signal, the circuit comprising:

means for receiving the video signal and processing first and second color difference samples of the video signal to provide first and second signal sequences of the color difference samples, the first signal sequence comprising alternating ones of the first and second color difference samples in a first order, and the second signal sequence comprising alternating ones of the first and second color difference samples in a second order in which corresponding pairs of the first and second color difference samples are reversed in order relative to the first signal sequence;

first multiplying means for multiplying the color difference samples of the first signal sequence by a first periodic function of a phase angle indicative of a desired hue, to provide a first multiplied signal sequence;

second multiplying means for multiplying the color difference samples of the second signal sequence by an alternately positive and negative second periodic function of the phase angle indicative of the desired hue, to provide a second multiplied signal sequence, the first and second periodic functions being in phase quadrature relationship; and means for summing the first and second multiplied signal sequences to provide first and second hue adjusted color difference samples, the summing means being operable to sum each multiplied first color difference sample with a corresponding multiplied second color difference sample.

According to another aspect of the present invention there is provided a hue control circuit for varying the hue of a video signal in the form of multiplexed first and second color difference samples, the circuit comprising:

means for reversing the order of the multiplexed first and second color difference samples such that corresponding pairs of the first and second color difference samples are reversed in order to form an inverted order video signal;

first multiplying means for multiplying the video signal by a cosine function of a phase angle indicative of a desired hue to provide a first multiplied signal;

second multiplying means for multiplying the inverted order video signal by a sine function of the phase angle indicative of the desired hue to provide a second multiplied signal; and means for summing the first and second multiplied signals to provide a hue adjusted video signal.

A preferred embodiment of the invention, to be described in greater detail hereinafter, provides a hue control circuit which can be used either in component video systems or in composite digital video systems. By virtue of the use of the first and second signal sequences of color difference samples, in which the first and second signal sequences have the color difference samples in different orders, it is possible to produce a hue control circuit having a relatively low number of circuit components.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 4A to 4G are timing diagrams showing the relative timings of signals at various parts of the circuit shown in FIG. 3.

DESCRIPTION OF THE PREFERRED EMBODIMENTS

In existing NTSC analog video systems, a hue control is provided which operates by changing the phase of the encoding or decoding subcarrier relative to the reference subcarrier burst. This change of phase leads to variation of the hue or color information in the signal without changing the saturation. However, in a component video system such as that used for processing component digital video signals, as explained above, there is no subcarrier and thus it is not possible to provide hue adjustment by variation of the encoding/decoding subcarrier phase.

Figure 1:
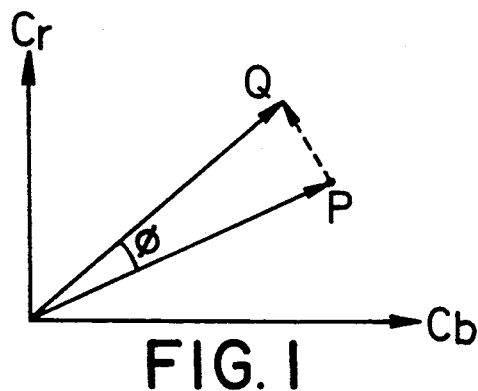
FIG. 1 is a graphical representation of variation of hue shown as a vector rotation of the video signal in the color plane.

In a component video system, the video signal may be processed in the form of color difference samples Cb and Cr. Referring to FIG. 1 which represents the color plane of a video signal in terms of the color difference samples Cb and Cr, a variation in hue can be represented by rotation of a vector P through an angle $\phi$ to form a resulting vector Q. It can be shown that, if the resulting hue adjusted color difference samples are termed Hb and Hr, $$Hb = Cb \cos \phi - Cr \sin \phi \quad (1)$$

$$Hr = Cb \sin \phi + Cr \cos \phi \quad (2)$$

In order to provide a hue control circuit implementing the equations (1) and (2) directly in hardware, four multipliers and two adders would be required, two multipliers and one adder being used for each of these equations.

Figure 2:
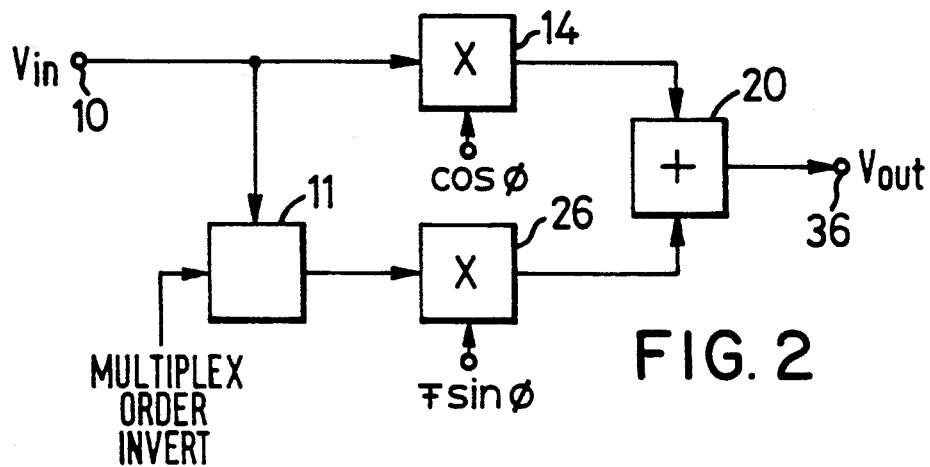
FIG. 2 is a schematic block diagram of a basic hue control circuit according to an embodiment of this invention.

Referring to FIG. 2, there is shown a schematic block diagram of a hue control circuit according to an embodiment of this invention. The circuit includes an input terminal 10 for receiving a multiplexed component video signal Vin comprising alternating color difference samples Cb and Cr. The input terminal 10 is connected to one input of a first multiplier 14 and also to a multiplex order inverting circuit 11, the output of which is connected to one input of a second multiplier 26. The first multiplier 14 receives a multiplication factor cos $\phi$ at another input, and the multiplied output is received at one input of an adder 20. The second multiplier 26 receives an alternating multiplication factor of either $-\sin \phi$ or $+\sin \phi$ at another input, and the multiplied output is received at another input of the adder 20. The summed output of the adder 20 is supplied to an output terminal 36. In operation, the circuit of FIG. 2 provides implementation of the equations (1) and (2) by reversing the order of the alternating color difference samples Cb and Cr in the multiplex order inverting circuit 11 for application to the second multiplier 26. Thus, in alternating modes of operation, the circuit produces the hue adjusted color difference sample Hb by implementation of the equation (1), and the hue adjusted color difference sample Hr by implementation of the equation (2). As a result, the circuit of FIG. 2 achieves a reduction in components, only two multipliers and one adder being required.

Figure 3:
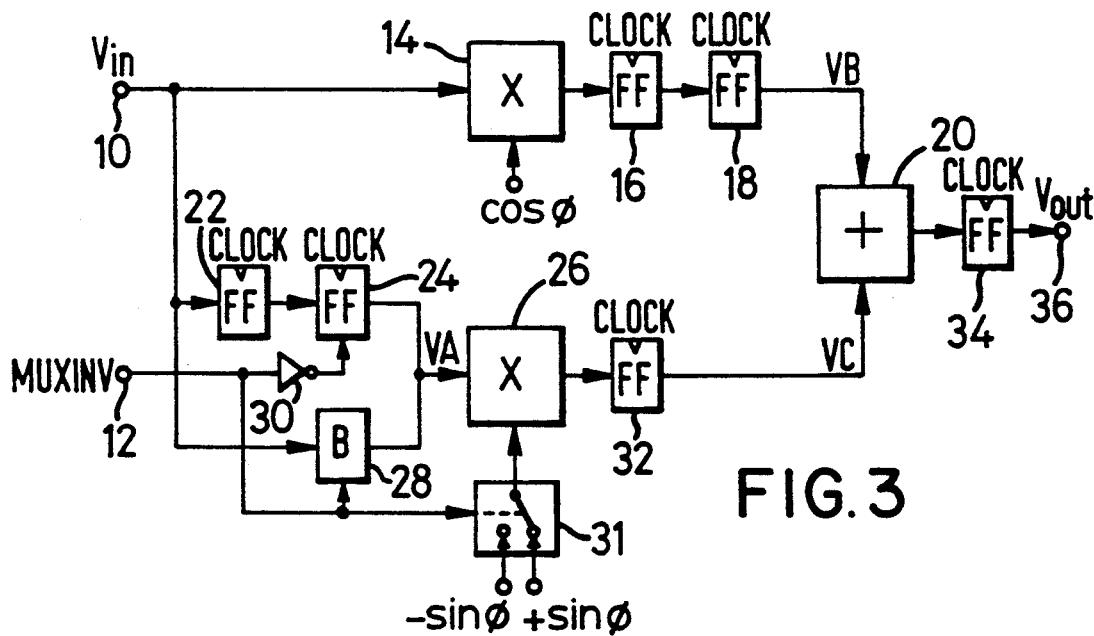
FIG. 3 is a more detailed circuit diagram of one implementation of the hue control circuit shown in FIG. 2.

The operation of the circuit shown in FIG. 2 will be better understood from the following description of the more detailed circuit shown in FIG. 3 and its operation according to the timing diagram of FIG. 4. Referring to FIG. 3, the multiplexed component video signal Vin (comprising alternating color difference samples Cb and Cr) is received at the input terminal 10. There is also provided a sample identifying signal terminal 12 for receiving a signal MUXINV that identifies which of the color difference samples Cb and Cr is being received. As in FIG. 2, the first multiplier 14 has one input connected to the input terminal 10 to receive the multiplexed component video signal Vin. The second input of the first multiplier 14 receives the multiplication factor cos $\phi$. The output of the first multiplier 14 is connected via two serially-connected flip-flops 16, 18 to one input of the adder 20.

The input terminal 10 is also connected via two serially-connected flip-flops 22, 24 to the first input of the second multiplier 26. This first input of the second multiplier 26 is also connected to the input terminal 10 via a buffer circuit 28, effectively connected in parallel with the flip-flops 22, 24. The sample identifying signal terminal 12 is connected directly to an enabling input of the buffer circuit 28 and also, via an inverter 30, to an enabling input of the flip-flop 24. Thus, depending on the state of the sample identifying signal MUXINV, the input component video signal is either received via the buffer circuit 28 at the second multiplier 26 effectively undelayed, or when it passes through the flip-flops 22, 24, it is delayed by two clock pulses. The flip-flops 22, 24 and the buffer circuit 28 are equivalent to the multiplex order inverting circuit 11 of FIG. 2. The second input of the second multiplier 26 receives a selected one of the multiplication factors $-\sin \phi$ or $+\sin \phi$. This is achieved by a selector 31 responsive to the sample identifying signal MUXINV. The output of the second multiplier 26 is connected via a flip-flop 32 to the second input of the adder 20. The output of the adder 20 is supplied via a flip-flop 34 to the output terminal 36, producing an output signal Vout.

The operation of the circuit shown in FIG. 3 will now be described with reference to the timing diagram shown in FIG. 4. In FIG. 4, signals VA, VB and VC are shown, the signal VA appearing at the first input of the second multiplier 26, the signal VB appearing at the first input of the adder 20, and the signal VC appearing at the second input of the adder 20. FIG. 4 also shows the input and output video signals Vin, Vout, the clock signal for the circuit, and the sample identifying signal MUXINV.

As stated above, the component video signal Vin applied to the input terminal 10 of the circuit of FIG. 3 is in the form of alternating color difference samples Cb and Cr. In FIG. 4, the component video signal is shown as the alternating samples Cb1, Cr1, Cb2, Cr2, Cb3, Cr3, Cb4 ... (etc.). In the first clock cycle of operation, the sample Cb1 is received and is applied to the first multiplier 14 where it is multiplied by the factor cos $\phi$. The output Cb1 cos $\phi$ is then applied to the two flip-flops 16, 18. The sample Cb1 is also applied to the flip-flop 22. At this time, the buffer circuit 28 is not enabled by the sample identifying signal MUXINV, and so the sample is not fed through the buffer circuit 28.

In the second clock cycle, the sample Cr1 is received and is again multiplied in the first multiplier 14 by cos $\phi$, the output Cr1 cos $\phi$ being applied to the flip-flop 16. Meanwhile, the previous multiplied sample Cb1 cos $\phi$ has been shifted to the output of the flip-flop 16 and is now fed to the input of the flip-flop 18. The sample identifying signal MUXINV has changed and thus the sample Cr1 is applied via the buffer circuit 28 to the second multiplier 26 in which it is multiplied by the factor $-\sin \phi$, this factor being selected by the selector 31. The output $-Cr1 \sin \phi$ is applied to the flip-flop 32.

In the third clock cycle, the sample Cb2 is received at the input terminal 10. As in the first clock cycle (in respect of the sample Cb1), the sample Cb2 is applied both to the first multiplier 14 and also to the flip-flop 22. Meanwhile, the multiplied first sample Cb1 cos $\phi$ has appeared at the output of the flip-flop 18 as the signal VB, and also the multiplied sample $-Cr1 \sin \phi$ has appeared at the output of the flip-flop 32 as the signal VC. These two multiplied samples are summed in the adder 20 to provide a summed output Cb1 cos $\phi - Cr1 \sin \phi = Hb1$. Also, the first sample Cb1 has now passed through the two flip-flops 22, 24 and appears as the signal VA at the input to the second multiplier 26. The selector 31, responsive to the sample identifying signal MUXINV, now selects the multiplication factor $+\sin \phi$ and thus the second multiplier 26 produces an output Cb1 sin $\phi$.

In the fourth clock cycle, the output Hb1 of the adder 20 is held in the flip-flop 34 and appears as the output signal Vout at the output terminal 36. Also, the sample Cr2 is received at the input terminal 10 and applied once more both to the first multiplier 14 and to the buffer circuit 28 which is again enabled by the sample identifying signal MUXINV. Thus the sample Cr2 appears as the signal VA, and is multiplied in the second multiplier 26 by the factor $-\sin\phi$ now selected by the selector 31. The output $-\text{Cr2}\sin\phi$ is supplied to the flip-flop 32. Meanwhile, the first multiplier 14 produces the output $\text{Cr2}\cos\phi$ to the flip-flop 16. The output of the flip-flop 18 is now the (two clock pulse) delayed multiplied sample $\text{Cr1}\cos\phi$, appearing as the signal VB. The output of the flip-flop 32 (the signal VC) is now the multiplied sample $\text{Cb1}\sin\phi$ and this is summed in the adder 20 with the multiplied sample $\text{Cr1}\cos\phi$ to provide the summed output Hr1.

In the fifth clock cycle, the output Hr1 of the adder 20 is held in the flip-flop 34 and appears as the output signal Vout. The operation of the other parts of the circuit proceeds as described above. Thus it will be seen that, whereas the input video signal Vin is applied directly to the first multiplier 14 such that the order of the color difference samples is Cb1, Cr1, Cb2, Cr2, Cb3, Cr3, Cb4 . . . (etc), the second multiplier 26 receives the color difference samples in the reverse order of Cr1, Cb1, Cr2, Cb2, Cr3, Cb3 . . . (etc) as shown by the signal VA in FIG. 4. The flip-flops 16, 18 are provided to allow for the delay caused by the flip-flops 22, 24 in the order reversal process, so that corresponding samples can be summed in the adder 20.

It will be apparent that the alternating use of the two multipliers 14, 26 and the adder 20 to implement each of the equations (1) and (2) in turn leads to a significant reduction in components over the four multipliers and the two adders which would otherwise need to be provided.

In the arrangements shown in FIGS. 2 and 3, hue control is effected by variation of the angle $\phi$ and application of phase-quadrature periodic functions (sine and cosine as illustrated) of the angle $\phi$ to the two multipliers 14, 26. A variable control can thus be provided to produce a variable voltage or digital value which can then be processed to provide the appropriate periodic functions for application to the multipliers 14, 26.

Although the above embodiment has been described as being applicable to a component video environment in which the color difference samples Cb and Cr are available in multiplexed form, it can also be used in composite digital systems in which hue control may not otherwise be as simply achieved as in the case of the existing NTSC analog systems. In that case, it may be necessary to generate the color difference samples Cb and Cr, and to supply them in alternating manner to the circuit. The input video signal need not be in multiplexed form; a suitable latch/flip-flop arrangement can then be provided to ensure that the appropriate samples are applied to the input of the circuit in the correct sequence. A similar arrangement can be provided at the output if a multiplexed output signal is not required.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Apparatus for adjusting the hue of a video signal having first and second color difference samples, said apparatus comprising:
    input means for alternately providing said first and second color difference samples of the video signal in a first order so as to constitute a first signal sequence;
    processing means for processing said first and second color difference samples in said first order to provide a second signal sequence of the color difference samples in which said first and second color difference samples are alternated in a second order, the order of said first and second color difference samples in said second order being reversed relative to said first order thereof in said first signal sequence;
    a first multiplier for multiplying said color difference samples of said first signal sequence by a first periodic function of an angle indicative of a desired hue to provide a first multiplied signal sequence;
    a second multiplier for multiplying said color difference samples of said second signal sequence by an alternately positive and negative second periodic function of said angle indicative of the desired hue and which is in phase quadrature relationship with said first periodic function to provide a second multiplied signal sequence as an output of said second multiplier; and
    a single adder for summing corresponding samples of the first and second multiplied signal sequences to provide first and second hue adjusted color difference samples.

2. Apparatus according to claim 1, wherein one of the first and second periodic functions is a sine function and the other of the first and second periodic functions is a cosine function.

3. Apparatus according to claim 1, wherein said processing means comprises temporary storing means for temporarily storing one of said first and second color difference samples, and supply means for supplying the temporarily stored color difference sample to said second multiplier after processing of the other of said first and second color difference samples.

4. Apparatus according to claim 3, wherein said temporary storing means comprises two series-connected flip-flops.

5. Apparatus according to claim 3, in which said processing means further comprises a buffer circuit which, when enabled, allows said other of said first and second color difference samples to be supplied to said second multiplier.

6. Apparatus for adjusting the hue of a video signal having first and second color difference samples, said apparatus comprising:
    input means for alternately providing said first and second color difference samples of the video signal in a first order so as to constitute a first signal sequence;
    processing means for processing said first and second color difference samples in said first order to provide a second signal sequence of the color difference samples in which said first and second color difference samples are alternated in a second order reversed relative to said first order thereof in said first signal sequence, said processing means including first temporary storing means for temporarily storing one of said first and second color difference samples, and means for supplying the temporarily stored color difference sample after processing of the other of said first and second color difference samples;

a first multiplier for multiplying said color difference samples of said first signal sequence by a first periodic function of an angle indicative of a desired hue to provide a first multiplied signal sequence;

a second multiplier for multiplying said color difference samples of said second signal sequence by an alternately positive and negative second periodic function of said angle indicative of the desired hue and which is in phase quadrature relationship with said first periodic function to provide a second multiplied signal sequence as an output of said second multiplier;

second temporary storing means for temporarily storing said first multiplied signal sequence supplied by said first multiplier; and a single adder for summing corresponding samples of the first multiplied signal from said second temporary storing means and of said second multiplied signal from said second multiplier.

7. Apparatus for adjusting the hue of a video signal which, as received, has pairs of multiplexed first and second color difference samples supplied in a first order, said apparatus comprising:

means for reversing said first order of the multiplexed first and second color difference samples in each of said pairs so as to provide a video signal with said first and second color difference samples in a second order;

a first multiplier for multiplying said video signal with said first and second color difference samples in said first order by a cosine function of an angle indicative of a desired hue to provide a first multiplied signal;

a second multiplier for multiplying said video signal with said first and second color difference samples in said second order by an alternately positive and negative sine function of said angle indicative of said desired hue to provide a second multiplied signal; and a single adder for summing said first and second multiplied signals to provide a hue adjusted video signal.

* * * * *